(12) United States Patent
Canelon et al.

(10) Patent No.: US 9,168,506 B2
(45) Date of Patent: Oct. 27, 2015

(54) ADDITIVE FOR HYDROCONVERSION PROCESS AND METHOD FOR MAKING AND USING SAME

(75) Inventors: Carlos Canelon, San Antonio de los Altos (VE); Angel Rivas, Los Teques (VE); Omayra Delgado, Los Teques (VE); Miguel Paiva, Los Teques (VE); Giuseppe Di Sarli, Caracas (VE); Luis Zacarias, San Antonio de los Altos (VE)

(73) Assignee: Intevep, S.A., Caracas (VE)

( * ) Notice: Subject to any disclaimer, the term of this patent is extended or adjusted under 35 U.S.C. 154(b) by 350 days.

(21) Appl. No.: 12/691,248

(22) Filed: Jan. 21, 2010

(65) Prior Publication Data

US 2011/0174690 A1    Jul. 21, 2011

(51) Int. Cl.
| | |
|---|---|
| *C10G 47/02* | (2006.01) |
| *B01J 20/30* | (2006.01) |
| *C10G 49/10* | (2006.01) |
| *B01J 35/00* | (2006.01) |

(52) U.S. Cl.
CPC .............. *B01J 20/30* (2013.01); *B01J 20/3021* (2013.01); *B01J 20/3078* (2013.01); *B01J 35/0026* (2013.01); *C10G 49/10* (2013.01); *C10G 2300/205* (2013.01); *C10G 2300/4025* (2013.01); *C10G 2300/80* (2013.01); *Y10T 428/2982* (2015.01)

(58) Field of Classification Search
CPC ..................................................... C10G 47/02
See application file for complete search history.

(56) References Cited

U.S. PATENT DOCUMENTS

| | | | |
|---|---|---|---|
| 3,562,150 A | 2/1971 | Hamilton et al. | |
| 3,763,303 A | 10/1973 | Khuri et al. | |
| 3,773,890 A | 11/1973 | Fox et al. | |
| 4,015,977 A * | 4/1977 | Crawford ........................ | 75/325 |
| 4,145,397 A | 3/1979 | Toida et al. | |
| 4,376,695 A | 3/1983 | Belinko et al. | |
| 4,382,068 A | 5/1983 | Rokukawa | |
| 4,401,573 A | 8/1983 | Perrone et al. | |
| 4,548,700 A | 10/1985 | Bearden, Jr. et al. | |
| 4,596,785 A | 6/1986 | Toulhoat et al. | |
| 4,600,504 A | 7/1986 | Kukes et al. | |
| 4,666,685 A | 5/1987 | Wiewiorowski | |
| 4,668,483 A | 5/1987 | Ladd et al. | |
| 4,670,229 A | 6/1987 | Wiewiorowski et al. | |
| 4,851,107 A | 7/1989 | Kretschmar et al. | |
| 4,863,887 A * | 9/1989 | Ohtake et al. ................. | 208/112 |
| 4,888,104 A * | 12/1989 | Ramirez de Aqudelo et al. ............................ | 208/112 |
| 4,941,966 A | 7/1990 | Merz et al. | |
| 4,969,988 A | 11/1990 | Jain et al. | |
| 5,087,596 A | 2/1992 | Clark et al. | |
| 5,124,024 A * | 6/1992 | Krzywicki et al. ........... | 208/112 |
| 5,951,849 A | 9/1999 | Miller et al. | |
| 6,635,599 B1 | 10/2003 | Eijsbouts et al. | |
| 7,585,406 B2 * | 9/2009 | Khadzhiev et al. ........... | 208/112 |
| 7,935,244 B2 | 5/2011 | Roy-Auberger et al. | |
| 8,298,982 B2 | 10/2012 | Pereira-Almao et al. | |
| 2006/0054534 A1 | 3/2006 | Chen et al. | |
| 2007/0025899 A1 | 2/2007 | Marcantonio | |
| 2007/0045156 A1 | 3/2007 | Khadzhiev et al. | |
| 2008/0156700 A1 | 7/2008 | Abulnaga et al. | |
| 2009/0023965 A1 | 1/2009 | Pereira et al. | |
| 2009/0136400 A1 | 5/2009 | Bhaduri | |
| 2009/0283447 A1 | 11/2009 | D'Elia et al. | |

FOREIGN PATENT DOCUMENTS

| | | |
|---|---|---|
| CN | 1 335 363 | 2/2002 |
| CN | 101332435 | 12/2008 |
| CU | 20100136 | 6/2010 |
| EP | 0 271 337 | 6/1988 |
| EP | 0 487 368 | 5/1992 |
| EP | 2 113 304 | 11/2009 |
| EP | 2 325 285 | 5/2011 |
| EP | 2 348 136 | 7/2011 |
| GB | 2 456 537 | 7/2009 |
| GB | 2456537 | 7/2009 |
| JP | 63270542 | 11/1988 |
| WO | 2006/031570 | 3/2006 |
| WO | 2007/059621 | 5/2007 |

OTHER PUBLICATIONS

Canadian office action dated Jan. 18, 2012.
Canadian Office action dated Nov. 4, 2013.
Dong et al., "Development of Residue Slurry Bed Hydrocracking Catalysis", Industrial Catalysts, vol. 12, No. 9, pp. 9-12, dated Sep. 30, 2004.
Russian Office Patent Apln. No. 2010 120 474 action dated Mar. 3, 2014.
European Patent Application No. 08 017 357.8-1361 office action Feb. 11, 2014.
Chinese Patent Apln. No. 201410028453.5 office action issued Mar. 6, 2015.
Chinese Patent Apln. No. 201010219239.X office action issued Jul. 22, 2014.

* cited by examiner

*Primary Examiner* — Randy Boyer
(74) *Attorney, Agent, or Firm* — Bachman & LaPointe, PC

(57) ABSTRACT

An additive for hydroconversion processes includes a solid organic material having a particle size of between about 0.1 and about 2,000 μm, a bulk density of between about 500 and about 2,000 kg/m3, a skeletal density of between about 1,000 and about 2,000 kg/m3 and a humidity of between 0 and about 5 wt %. Methods for preparation and use of the additive are also provided. By the use of the additive of the present invention, the hydroconversion process can be performed at high conversion level.

25 Claims, 6 Drawing Sheets

ADDITIVE FOR HYDROCONVERSION PROCESS AND METHOD FOR MAKING AND USING SAME

BACKGROUND OF THE INVENTION

The invention relates to an additive used in catalytic processes for hydroconversion.

Hydroconversion processes in general are known, and one example of such a process is that disclosed in co-pending and commonly owned U.S. patent application Ser. No. 12/113,305, filed May 1, 2008. In the process disclosed therein, catalysts are provided in aqueous or other solutions, one or more emulsions of the catalyst (aqueous solution) in oil are prepared in advance and the emulsions are then mixed with the feedstock, with the mixture being exposed to hydroconversion conditions.

The disclosed process is generally effective at the desired conversion. It is noted, however, that the catalysts used are potentially expensive. It would be beneficial to find a way to recover this catalyst for re-use.

In addition, foaming and the like in hydroconversion reactors can create numerous undesirable consequences, and it would be desirable to provide a solution to such problems.

Hydroconversion processes in general for heavy residues, with high metal, sulfur and asphaltene contents, cannot reach high conversions (more than 80 wt %) without recycle and high catalyst concentration.

Additives which are known to be used to try to control foam in reactors can be expensive and can chemically decompose in the reaction zone, potentially leading to more difficult by-product processing and the like.

SUMMARY OF THE INVENTION

In accordance with the invention, an additive used in catalytic hydroconversion processes is provided wherein the additive scavenges catalyst metals and also metals from the feedstock and concentrates them in a heavy stream or unconverted residue material which exits the process reactor, and this heavy stream can be treated to recover the metals. The stream can be processed into flake-like materials. These flakes can then be further processed to recover the catalyst metals and other metals in the flakes which originated in the feedstock. This advantageously allows the metals to be used again in the process, or to be otherwise advantageously disposed of.

The hydroconversion process comprises the steps of feeding a heavy feedstock containing vanadium and/or nickel, a catalyst emulsion containing at least on group 8-10 metal and at least one group 6 metal, hydrogen and an organic additive to a hydroconversion zone under hydroconversion conditions to produce an upgraded hydrocarbon product and a solid carbonaceous material containing said group 8-10 metal, said group 6 metal, and said vanadium.

Further, the additive can be use to control and improve the overall fluid-dynamics in the reactor. This is due to an antifoaming affect created by use of the additive in the reactor, and such foam control can provide better temperature control in the process as well.

The additive is preferably an organic additive, and may preferably be selected from the group consisting of coke, carbon blacks, activated coke, soot and combinations thereof. Preferred sources of the coke include but are not limited to coke from hard coals, and coke produced from hydrogenation or carbon rejection of virgin residues and the like.

The additive can advantageously be used in a process for liquid phase hydroconversion of feedstocks such as heavy fractions having an initial boiling point around 500° C., one typical example of which is a vacuum residue.

In the hydroconversion process, the feedstock is contacted in the reaction zone with hydrogen, one or more ultradispersed catalysts, a sulfur agent and the organic additive. While the present additive would be suitable in other applications, one preferred process is carried out in an upflow co-current three-phase bubble column reactor. In this setting, the organic additive can be introduced to the process in an amount between about 0.5 and about 5.0 wt % with respect to the feedstock, and preferably having a particle size of between about 0.1 and about 2,000 μm.

Carrying out the process as described herein using the organic additive of the invention, the organic additive scavenges catalyst metals from the process, for example including nickel and molybdenum catalyst metals, and also scavenges metals from the feedstock, one typical example of which is vanadium. Thus, the product of the process includes a significantly upgraded hydrocarbon product, and unconverted residues containing the metals. These unconverted residues can be processed into solids, for example into flake-like materials, containing heavy hydrocarbon, the organic additive, and concentrated catalyst and feedstock metals. These flakes are a valuable source of metals for recovery as discussed above.

BRIEF DESCRIPTION OF THE DRAWINGS

A detailed description of preferred embodiments of the invention follows, with reference to the attached drawing, wherein.

DETAILED DESCRIPTION

The invention relates to an additive used in catalytic hydroconversion processes of a heavy feedstock. The additive acts as a scavenger of catalyst and feedstock metals, and concentrates them in a residual phase for later extraction. Further, the additive serves as a foam controlling agent, and can be used to improve overall process conditions.

Figure 1:
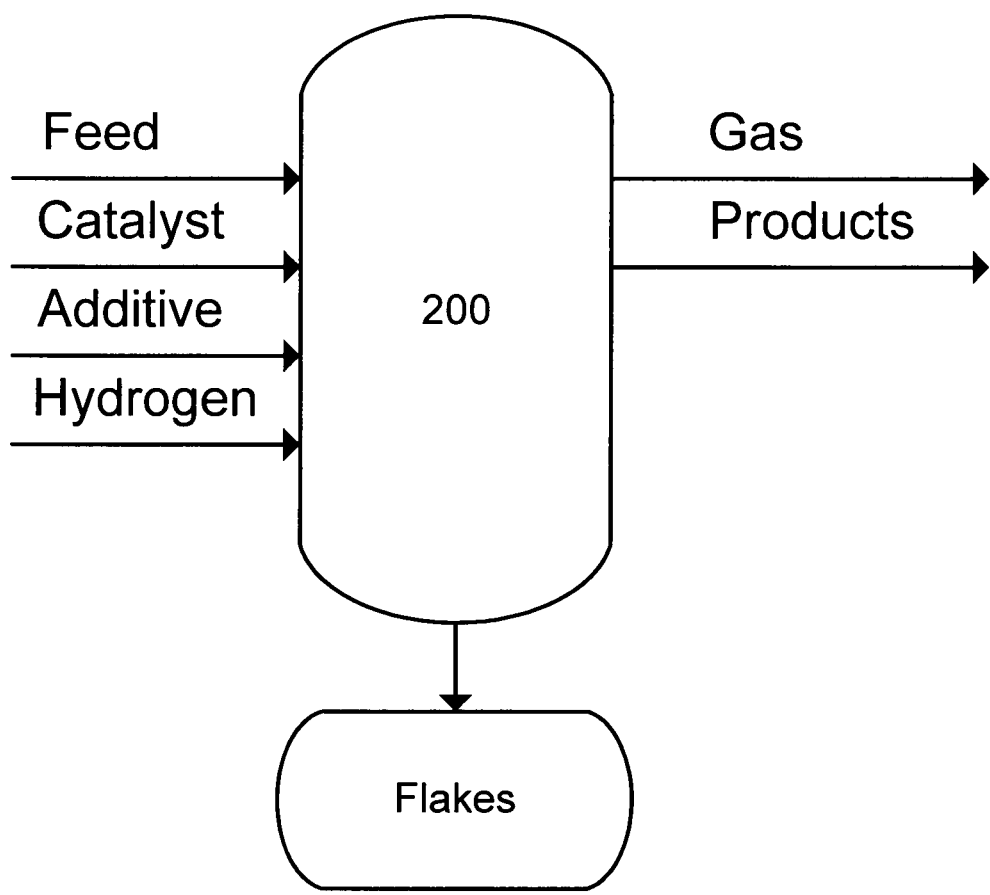
FIG. 1 schematically illustrates a process according to the invention.

A brief description of this hydroconversion process is given here, using unit 200 in FIG. 1. In this hydroconversion process the feedstock, containing vanadium and/or nickel, is contacted with a catalyst consisting of one two or more emulsions (water in oil), containing at least on group 8-10 metal and at least one group 6 metal, under hydroconversion conditions, which means, high hydrogen partial pressure and high temperature, and also in the presence of an additive which has one purpose to concentrate the metals over its surface, making a metal recovery process easier.

Within unit 200, conversion of the feedstock occurs, and the outflows from unit 200 include a product stream including an upgraded hydrocarbon phase which can be separated into liquid and gas phases for further treatment and/or feeding to a gas recovery unit as desired, and a residue containing the additive which can be solidified or separated in a stream rich in solids, to be fed to a metal recovery unit, and unconverted vacuum residue, which can be recycled.

The feedstock for the hydroconversion process can be any heavy hydrocarbon, and one particularly good feedstock is vacuum residue which can have properties as set forth in Table 1 below:

TABLE 1

| Properties | Unit | |
|---|---|---|
| Distillation LV % ASTM D1160 | | |
| IBP | °F. | 600-900 |
| Viscosity@210° F. | cst | <80000 |
| API | — | 1-7 |
| Sulfur | wt % | 3-8 |
| Nitrogen | wt % | <2 |
| Asphaltenes | wt % | 15-30 |
| Conradson Carbon | wt % | 15-30 |
| Metal (V + Ni) | wtppm | 200-2000 |

Alternative feeds include but are not limited to feeds derived from tar sands and/or bitumen.

For a vacuum residue (VR) feedstock, this can come from a vacuum distillation unit (VDU) for example, or any other suitable source. Other similar feeds can be used, especially if they are of a type that can be usefully upgraded through hydroconversion and contain feedstock metals such as vanadium and/or nickel.

As indicated above, the additive is preferably an organic additive such as coke, carbon black, activated coke, soot, and combinations thereof. These materials can be obtained from any of numerous sources, and are readily available at very low cost. The organic additive can preferably have a particle size of between about 0.1 and about 2,000 μm.

The catalysts used are preferably a metal phase as disclosed in co-pending U.S. Ser. No. 12/113,305. The metal phase advantageously is provided as one metal selected from groups 8, 9 or 10 of the periodic table of elements, and another metal selected from group 6 of the periodic table of elements. These metals can also be referred to as group VIA and VIIIA metals, or group VIB and group VIIIB metals under earlier versions of the periodic table.

The metals of each class are advantageously prepared into different emulsions, and these emulsions are useful as feed, separate or together, to a reaction zone with a feedstock where the increased temperature serves to decompose the emulsions and create a catalyst phase which is dispersed through the feedstock as desired. While these metals can be provided in a single emulsion or in different emulsions, both well within the scope of the present invention, it is particularly preferred to provide them in separate or different emulsions.

The group 8-10 metal(s) can advantageously be nickel, cobalt, iron and combinations thereof, while the group 6 metal can advantageously be molybdenum, tungsten and combinations thereof. One particularly preferred combination of metals is nickel and molybdenum.

One embodiment of a suitable hydroconversion process is that disclosed in a simultaneously filed US patent application Ser. No. 12/691,205, which is incorporated herein by reference. In such a process, more than the two mentioned metals can be used. For example, two or more metals from group 8, 9 or 10 can be included in the catalyst phases of the emulsions.

The catalyst emulsion(s) and heavy feedstock can be fed to the reactors preferably in amounts sufficient to provide a ratio of catalyst metals to heavy feedstock, by weight, of between about 50 and about 1,000 wtppm.

Hydrogen can be fed to the process from any suitable source.

The reaction conditions can be as set forth in Table 2 below:

TABLE 2

| Reactor Pressure | 130-210 barg |
|---|---|
| Reactor Temperature | 430-470° C. |
| Conversion Rate | 80% or more |

Then according to the invention, in a slurry feed process, the unit 200 receives a vacuum residue (VR). The additive particles can be added to the VR, in a concentration between 0.5-5 wt % respect to the feedstock, and agitated. The agitated slurry is preferably pumped up to an elevated pressure, preferably over 200 barg, by high-pressure slurry pumps. The slurry is also heated to an elevated temperature, preferably over 400° C. Upstream, catalyst emulsions, sulfur agent and hydrogen are injected unto the slurry feed. After a slurry furnace for heating the slurry, more hydrogen can be added if needed.

The total mixture of VR, organic additive, catalyst emulsions, sulfur agent and hydrogen are introduced into the reactor and deeply hydroconverted into the desired lighter materials. Most of the hydroconverted materials are separated as vapor in a High Pressure High Temperature separator, and the vapor can be sent to a later unit for hydrotreating and further hydrocracking as needed.

In the meantime, the bottom product of the separator, in the form of a heavy slurry liquid, can be sent to a vacuum distillation unit to recover, under vacuum, any remaining lighter materials, and the final remaining bottom residue which is the unconverted residue could be sent to different type of processes where it can be converted into a solid material.

Typical yield from a specified feedstock is set forth in Table 3 below:

TABLE 3

| | Weight |
|---|---|
| Feed Stock | |
| Vacuum Residue | 100 |
| Catalyst Emulsions + Coke Additive | 8-10 |
| Flushing Oil (HGO) | 2.6-3.6 |
| Hydrogen | 1.8-3 |
| Feed Total | 112.4-116.6 |
| Products | |
| $C_1$-$C_4$ | 7-9 |
| $H_2O$ | 1-2 |
| $H_2S$ + $NH_3$ | 3.4-4.0 |
| Naphtha | 16-20 |
| Middle Distillates | 28-34 |
| VGO | 40-45 |
| Total Products (excl. Flakes) | 95.4-114 |
| Unconverted Residue or Flakes | 17-9 |

One of the units for converting the bottom residue into a solid material could be a flaker unit. The resulting flakes can advantageously have the following composition:

TABLE 4

| Physical state and appearance | Solid brittle |
|---|---|
| API | −5-(−14.4) |
| Color | Brilliant Black |
| Volatility | Negligible at room temperature |
| Boiling Point | Greater than 500° C. |
| Density at 15° C. (kg/m$^3$) | 900-1350 |
| Toluene Insoluble wt % | 15-40 |
| Asphaltenes (IP-143) wt % | 30-50 preferably 30-40 |
| Heptane Insoluble (wt %) | 28-50 |
| Carbon Residue (Micron method) wt % | 22-55 |
| Molybdenum wtppm | 1500-5000 |
| Vanadium wtppm | 1400-6500 |
| Nickel wtppm | 50-3000 |
| Carbon Content wt % | 85-93 |
| Hydrogen Content wt % | 5-9 |
| Ratio Carbon/Hydrogen | 10-17 |
| Total Nitrogen wt % | 1.-2.5 |
| Sulfur wt % | 2.2-2.7 |
| VGO (%) | 6-14 |
| Ash wt % | 0.2-2.0 |
| Volatile Matter wt %: 61.4 | 60-80 |
| Heating Value BTU/Lb | 15700-16500 |
| Moisture wt %: | 0-8.00 |
| Hardness index (HGI) | 50-68 |
| Softening Point ° C.: | 110-175 |
| Kinematic Viscosity at 275° F. cSt | 13,000-15,500 |
| Flash Point ° C. | 300-310 |
| Pour Point ° C. | 127 |

| Simulated distillation (D-7169) | % OFF(wt %) | T (° C.) |
|---|---|---|
| | IBP | 442.9 |
| | 1 | 445.6 |
| | 5 | 490.7 |
| | 10 | 510.9 |
| | 15 | 527.0 |
| | 20 | 541.9 |
| | 25 | 557.7 |
| | 30 | 574.9 |
| | 40 | 618.9 |
| | 50 | 668.5 |
| | 58 | 715.0 |

These flakes, containing remaining organic additive and also the catalyst metals and metal from the feedstock which is scavenged by the catalyst according to the process of the present invention, can themselves be provided to consumers as a source of useful metals, or can be used as fuel, or can be treated for extraction of the metals for re-use as process catalyst and the like.

Of course, the metals to be recovered include not only the catalyst metals used in the process, but also certain metals such as vanadium which are native to the feedstock.

As set forth above, an organic additive is an important aspect of the hydroconversion process disclosed in the simultaneously filed US patent application Ser. No. 12/691,205. This additive can be obtained from numerous sources, for example coke from many sources including hard coals, carbon blacks, activated coke, soots from gasifiers, cokes produced from hydrogenation or carbon rejection reactions, virgin residues and the like. It should be appreciated that these numerous sources allow preparation of the additive from readily available and affordable raw materials. A method for preparing the additive from such raw materials is discussed below, and the end result for use as an additive according to the invention preferably has a particle size of between about 0.1 and about 2,000 μm, a bulk density of between about 500 and about 2,000 kg/m$^3$, a skeletal density of between about 1,000 and about 2,000 kg/m$^3$ and a humidity of between 0 and about 5 wt %. More preferably, the particle size is between about 20 and about 1,000 μm.

Figure 2:
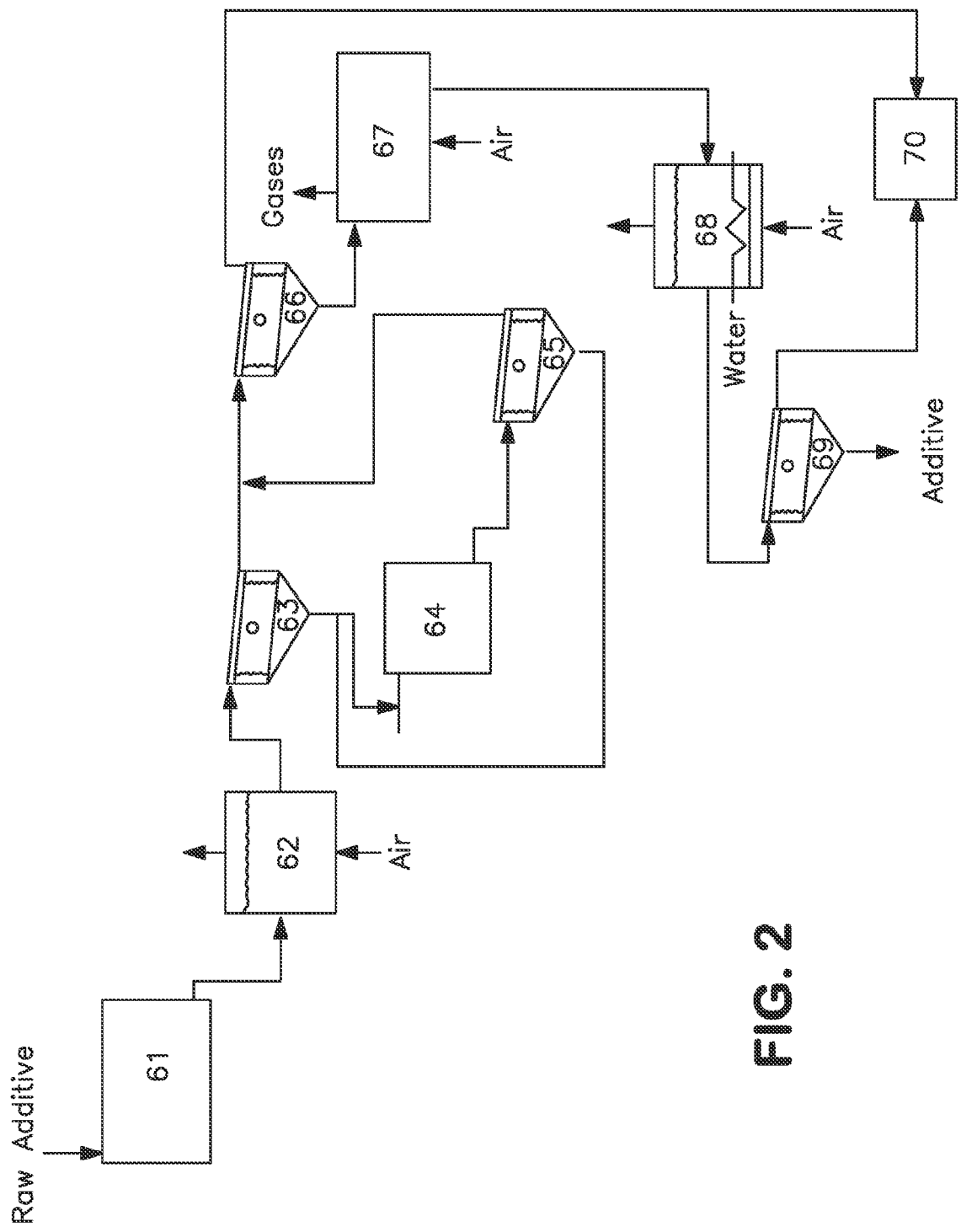
FIG. 2 schematically illustrates a method for preparation of an organic additive according to the invention.

Referring to FIG. 2, a method for making the additive of the present invention is illustrated. The starting raw material can typically be as described above, and can have properties such as bulk density of between about 500 and about 2,000 kg/m$^3$, a humidity of between about 5 wt % and about 20 wt %, a hardness of between about 20 HGI and about 100 HGI and a maximum particle size between about 5 cm to about 10 cm. This raw material is preferably first fed to a primary milling station 61 where the material is milled so as to reduce the particle size by an order of magnitude of preferably about 10. These preliminarily milled particles can have a particle size typically between about 20 mm and about 20 μm, and are fed to a drying zone 62. In the drying zone, the particles are exposed to a stream of air which removes humidity from the particles preferably to less than about 5% wt. The resulting dried particles are then fed to a primary classification zone 63, where the particles are separated into a first group which meets a desired particle size criteria, for example less than or equal to about 1000 μm, and a second group which does not meet this criteria. As shown, while the acceptable particle sized material of the first group is fed to a secondary classification zone 66, the second group needs additional milling and is preferably fed to a secondary milling station 64 where it is further ground or otherwise mechanically treated to reduce the particle size. The further milled product is fed to another classification zone 65, where particles which do now meet the criteria are fed back to combine with those that initially met the criteria, and those which still do not meet the criteria are recycled back through secondary milling station 64 as needed.

From secondary classification station 66, some particulate material will now be found that does not meet the desired criteria, and this material can be separated off and fed to an agglomeration station 70, where the particles are granulated to obtain particles with a higher diameter by means of a mixture of chemical substances. In the meantime, the particles which meet the criteria at station 66 are now fed to a heat treatment station (67) where they are exposed to a stream of heated air to bring their temperature up to between about 300 and 1,000° C., under this conditions a porogenesis process takes place. The heated particles are then fed to a cooling station (68) where they are cooled, in this instance with a stream of water cooled air. The resulting particles should have a temperature of less than about 80° C.

The heated and cooled particles can now be fed to one more classification zone 69 to again separate out any particles which do not meet the desired particle size criteria. Such particles that do not pass can be fed to agglomeration zone 70, while those which do pass can be used as the additive according to the invention.

The organic additive can ideally be used in an amount between about 0.5 and about 5 wt % with respect to the feedstock, and in this amount can serve both to scavenge catalyst and feedstock metals and control foaming in the reactor to provide more stable and efficient conditions in the reactor.

In the reactor, when using the additive of the present invention, the reaction can advantageously be carried out at a gas velocity of greater than or equal to about 4 cm/s.

These advantageous process conditions can produce a hydroconversion with an asphaltene conversion rate of at least about 75 wt % and a Conradson carbon conversion of at least about 70 wt %, and these rates are difficult or impossible to be obtained otherwise, using conventional techniques.

Figure 3:
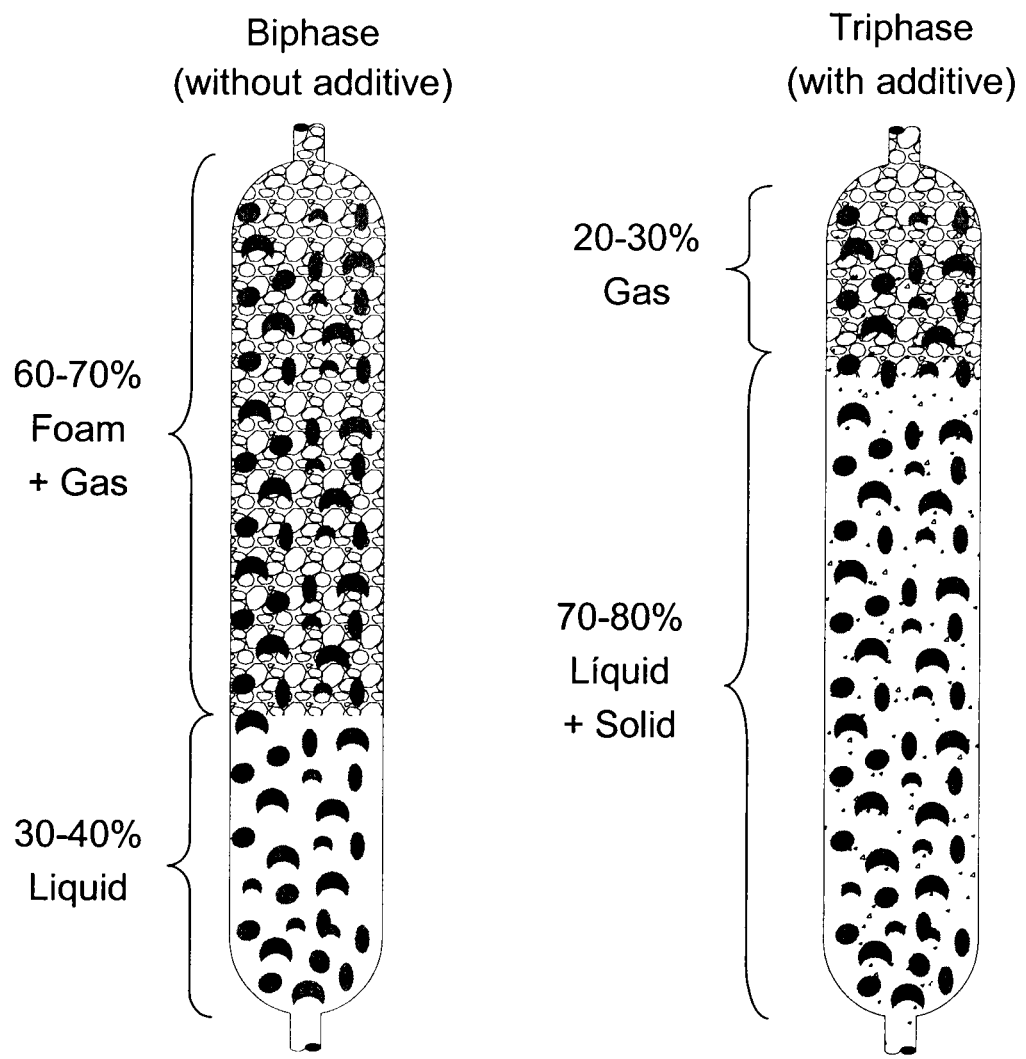
FIG. 3 schematically illustrates the benefit of using the additive according to the invention.

Turning to FIG. 3, two views are shown of reactors undergoing a hydroconversion process. In the left side view, a reactor is shown where the process is being carried out without any additive according to the invention. As shown, the reaction is a biphase reaction, and has a lower portion with only liquid and an upper portion, approximately 60-70 v %, of foam and gas. The right side view of FIG. 3 shows a similar reactor when operated with the additive of the present invention, and shows that foam is now much better controlled, with 70-80 v % of the reactor being filled with a liquid and solid phase, and an upper 20-30 v % of the reactor containing gas.

The foam reduction is caused by breaking the bubbles, thereby diminishing diffusion problems by providing a better contact between gas and liquid. These conditions, obtained by using the additive according to the invention, lead to much more effective conversion, a better temperature control and a reduction of unwanted hot spots.

During the course of the hydroconversion reactions in unit 200, the heaviest components of the feedstock tend to become insoluble in the lighter fractions generated by the reaction itself. High temperatures promote polymerization and condensation reactions of aromatic clusters and when difference between the solubility parameters of the two pseudo-components (asphaltenes and maltenes) approaches a critical value, the system gives rise to the appearance of sediments and therefore, to asphaltene precipitation and coke formation. This loss of residue stability at very high conversion level can be controlled by effect of the coke and asphaltenes scavenger of the organic additive. Thereby, a maximum conversion is achievable. This scavenger effect is show in example 1.

EXAMPLE 1

Coke/Asphaltene Scavenger Capability

This example illustrates asphaltenes, coke and/or polycondensed ring aromatic compounds catching capability of the carbonaceous additive.

In this example, Petrozuata petroleum coke was used to generate the carbonaceous additive, this coke comes from delayed coking process. This coke was thermally treated through a moderate combustion process (porogenesis) with air to generate some porosity and surface area. The particle size was adjusted in the range of 200-900 μm, following the scheme represented in FIG. 2, the carbonaceous additive was generated and the following experimentation was effected.

Table 55 shows Petrozuata coke composition.

TABLE 5

| Element | wt % |
|---------|------|
| Carbon | 86.6-88.9 |
| Hydrogen | 4.2-4.7 |
| Sulfur | 4.4-4.8 |
| Vanadium | 0.20-0.22 |
| Nickel | 0.30-0.54 |
| Iron | 0.106 |
| Ashes | 0.21-0.52 |
| Volatiles | 9.9-12.0 |

10 g of Merey/Mesa vacuum residue (VR) were mixed with 100 ml of toluene; the mixture was placed in stirring to dissolve the VR. After that, 120 ml of n-heptane were added, agitation was maintained for 10 min. Then the carbonaceous additive was added in an amount of 1.5 wt % to RV. It was subsequently agitated for 24 h. Finally, the sample was filtered, washed with n-heptane and the carbonaceous additive was dried in a stove for 4 h. After that, the cooled solid obtained was weighed. The amount of asphaltenes retained per gram of additive used was calculated according to the initial amount of additive used.

Table 6 shows pore size, superficial area and asphaltene scavenger capability of carbonaceous additive.

TABLE 6

| | |
|---|---|
| Pore Size(Å) | 15.6 |
| Superficial Area(m$^2$/g) | 270 |
| Asphaltenes scavenger capability (wt %) | 13 |

EXAMPLE 2

Metal Scavenger

This example illustrates metal scavenger capability of the carbonaceous additive.

In this example, flake like material containing the unconverted vacuum residue and the remaining organic additive was used to quantify the metal content and metal mass balance of the hydroconversion process.

In this example the remaining organic additive was separated by using a desolidification procedure with toluene as solvent. Following the scheme represented in FIG. 1, flakes where generated and the following experimentation was effected.

50.00 g of flakes were dissolved in 350 ml of hot toluene, this mixture was then centrifuged at 1500 rpm for 20 minutes to separate the unconverted residue of the additive. The solids were decanted and washed using toluene Soxhlet extraction, which is a continuous extraction method whereby fresh solvent continuously flows through the compound to be extracted. After that, the solids were dried in a vacuum oven for two hours at 130° C. The unconverted vacuum residue was recovered by evaporating the toluene. In this example the amount of dried solids was 4.9 g.

Finally, the metal content in solids and in the unconverted vacuum residue was determined by inductively coupled plasma (ICP) coupled to a OES.

Table shows Mo, Ni and V content of flakes, additive and the unconverted vacuum residue.

TABLE 7

| | Mo | Ni | V | Fe |
|---|---|---|---|---|
| Flakes analyses (wtppm) | 1977 | 1183 | 2103 | 459 |
| Dried Solid Additive analyses (wtppm) | 3812 | 2790 | 3984 | 822 |
| Calculated metal in dried solids$^a$ (wtppm) | 1868 | 1367 | 1952 | 403 |
| Metal recovery ratios$^b$ (wt %) | 94.5 | 115.6 | 92.8 | 87.8 |
| Non-converted vacuum residue (wtppm) | <5.0 | 65 | 65 | <5.0 |
| Experimental conditions | | | | |
| Solvent | Toluene | | | |
| Measured Flakes (g) | 10.00 | | | |
| Measured dried solids (g) | 4.90 | | | |

$^a$Calculated Metals in Dried Solids = Dried Solids Analysis * Measured Dried Solids (g)/Measured Flakes (g).
$^b$Some yields above 100% - within experimental error.

EXAMPLE 3

Fluid-Dynamic and Temperature Control

Following the scheme represented in FIG. 1, the following experimentation was effected.

The test was carried out using sample of vacuum residue (VR) of Canadian oil, prepared from Athabasca crude.

This VR was fed into a slurry bubble column reactor without any internals, with a total capacity of 10 BPD, with a temperature control based on a preheater system and cool gas injection. This reactor has a length of 1.6 m and a diameter of 12 cm.

For this test the reactor was operated at 0.42 T/m³h. Three serially connected vertical slurry reactors were used during this test. The conditions were maintained for 11 days.

Conditions are summarized in Table 8.

TABLE 8

| Feedstock characteristics | |
| --- | --- |
| API density (60° F.) | 2.04 |
| Residue 500° C.+ (wt %) | 97.60 |
| Asphaltenes (insolubles in heptane) (wt %) | 21.63 |
| Metal content (V + Ni) (wtppm) | 462 |
| Sulfur (wt %) | 6.56 |
| Process variables | |
| WSHV (T/m³h) | 0.42 |
| Feedrate (kg/h) | 24 |
| Total pressure (barg) | 169 |
| Reactor average temperature (° C.) | 453 |
| Gas/Liquid ratio (scf/bbl) | 34098 |
| Gas superficial velocity (inlet first reactor) (cm/s) | 7.48 |
| Particle size (μm) | 200-300 |
| Organic additive concentration (wt %) | 1.5 |
| Nickel catalyst concentration (wtppm) | 92 |
| Molybdenum catalyst concentration (wtppm) | 350 |

Figure 4:
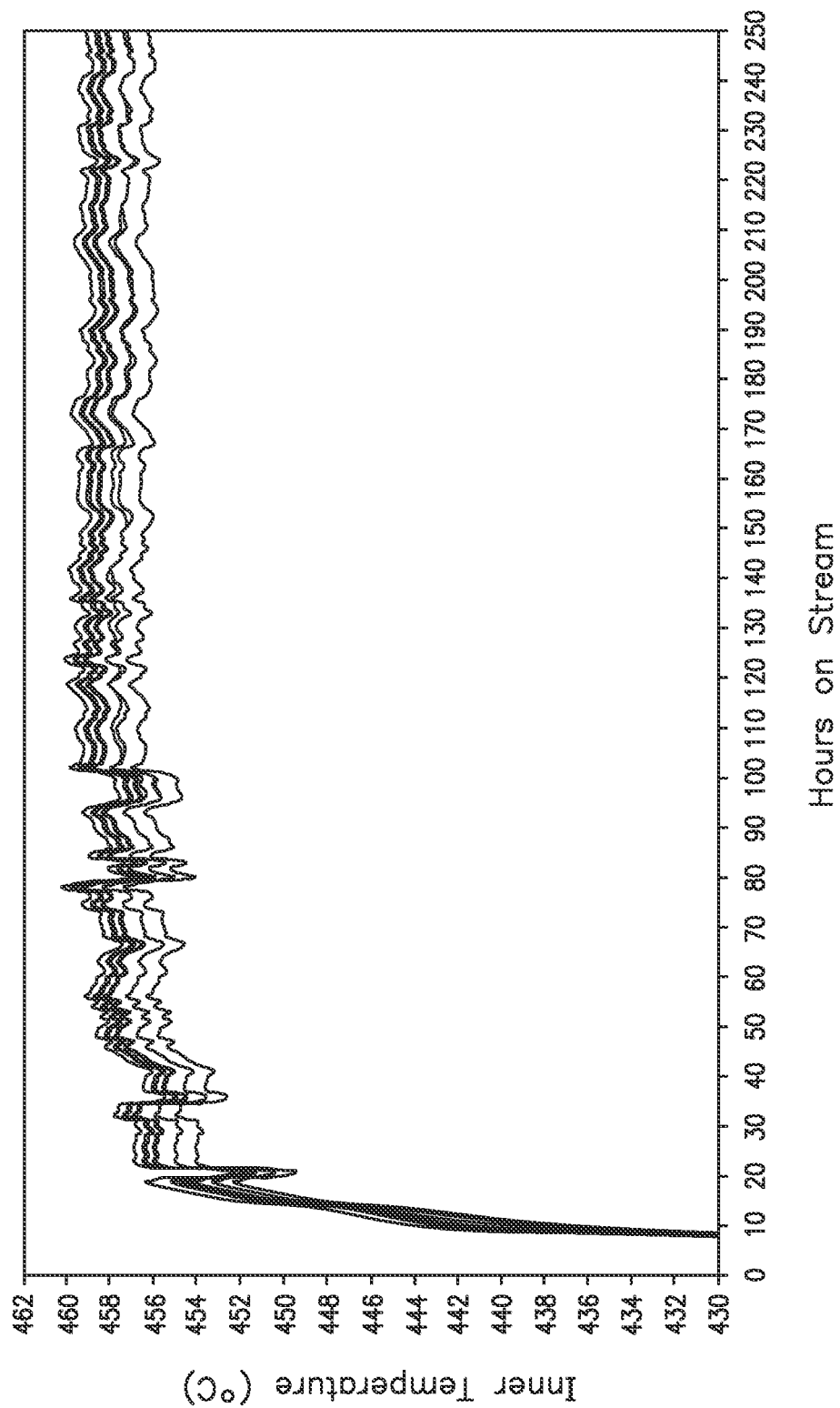
FIG. 4 schematically illustrates the inner temperature profiles of the reactor when the additive of the invention is used.

During this test the inner temperatures of the first reactor was measured at 12 different highs, having as a result the profile shown in FIG. 4.

In FIG. 4 it is possible to observe the effect of the additive over the temperature. At the beginning of the test the profile varies between 2-4° C., at intervals of 10 hours, for the same high, it presents an unstable behavior. After the additive has reached a stable concentration inside of the reactor the profile varies, at most, less than 2° C. and the behavior is appreciably more stable.

Figure 5:
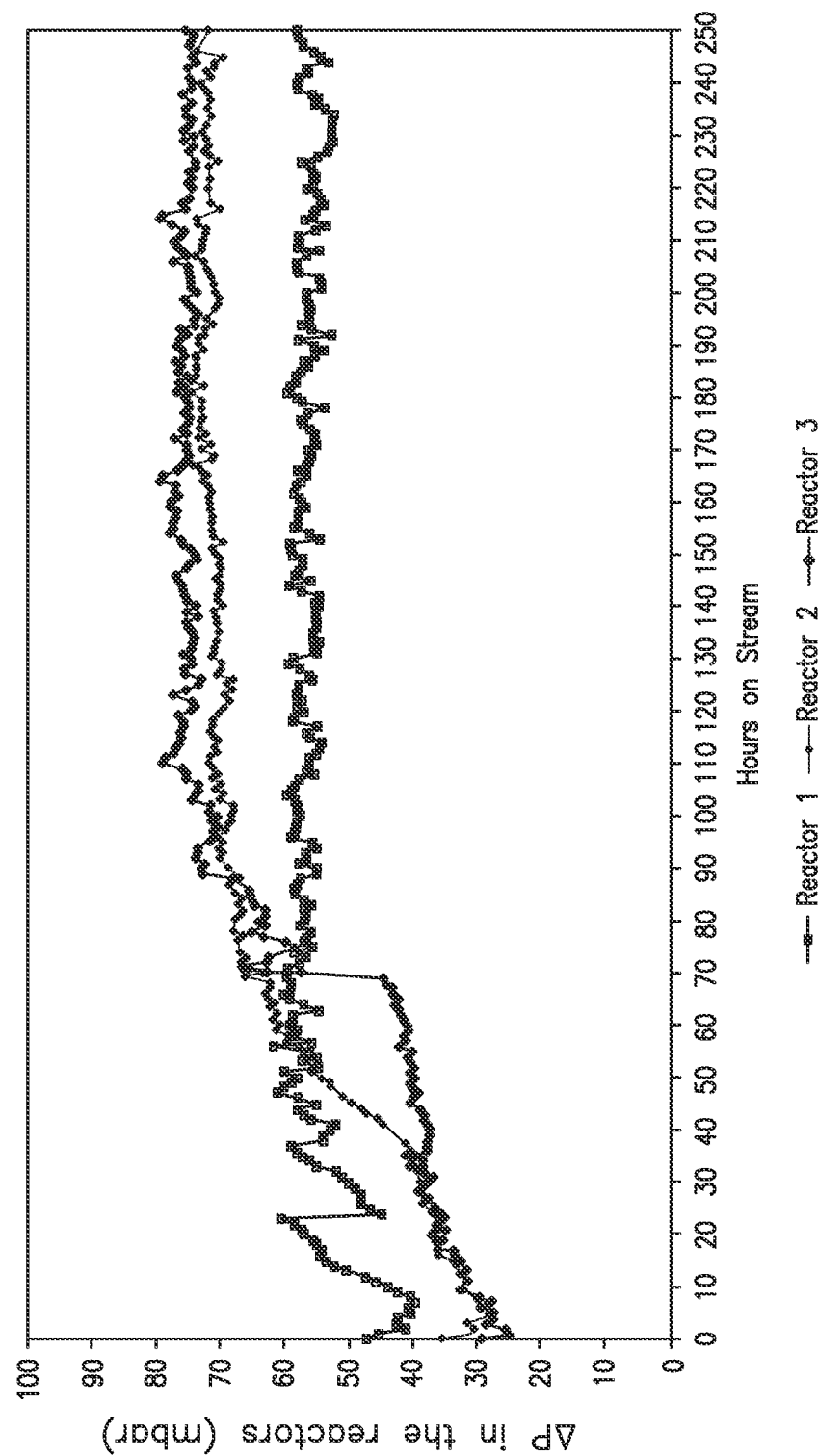
FIG. 5 schematically illustrates the pressure differential profiles of the reactor relates to fluid-dynamic control when the additive of the invention is used.

The pressure differentials were measured for the three reactors, obtaining the profile shown in FIG. 5.

This profile shows that at around the point of 100 hours on stream the three reactors have a stable concentration of solids, which is noteworthy since the pressure differentials show an almost linear behavior since the first hour. This is in concordance with the temperature profile, which has a stable behavior since the same first hour.

This evidences that the additive gives a fluid-dynamic control, which also acts, at the same time, as a temperature control.

EXAMPLE 4

Foam Control and Phase Distribution

Following the scheme represented in FIG. 1, the following experimentation was effected.

This example was carried out using a vacuum residue (VR) of Venezuelan oil, Merey/Mesa.

This VR was fed into a slurry bubble column reactor without any internals, with a total capacity of 10 BPD, with a temperature control based on a preheater system and cool gas injection.

For this test the reactor was operated at 0.4 T/m³h (spatial velocity), using three serially connected vertical slurry reactors. The plant was in continuous operation for 21 days.

Conditions are summarized in Table 99.

TABLE 9

| Feedstock characteristics | |
| --- | --- |
| API density (60° F.) | 5.0 |
| Residue 500° C.+ (wt %) | 96.3 |
| Asphaltenes (IP-143) (wt %) | 19.3 |
| Metal content (V + Ni) (wtppm) | 536 |
| Sulfur (wt %) | 3.28 |
| Process variables | |
| WSHV (T/m³h) | 0.4 |
| Feedrate (kg/h) | 24 |
| Total pressure (barg) | 170 |
| Reactor average temperature (° C.) | 452.1 |
| Gas/Liquid ratio (scf/bbl) | 40738 |
| Gas superficial velocity (inlet first reactor) (cm/s) | 6.4 |
| Particle size (μm) | 212-850 |
| Organic additive concentration (wt %) | 1.5 |
| Nickel catalyst concentration (wtppm) | 132 |
| Molybdenum catalyst concentration (wtppm) | 500 |

Figure 6:
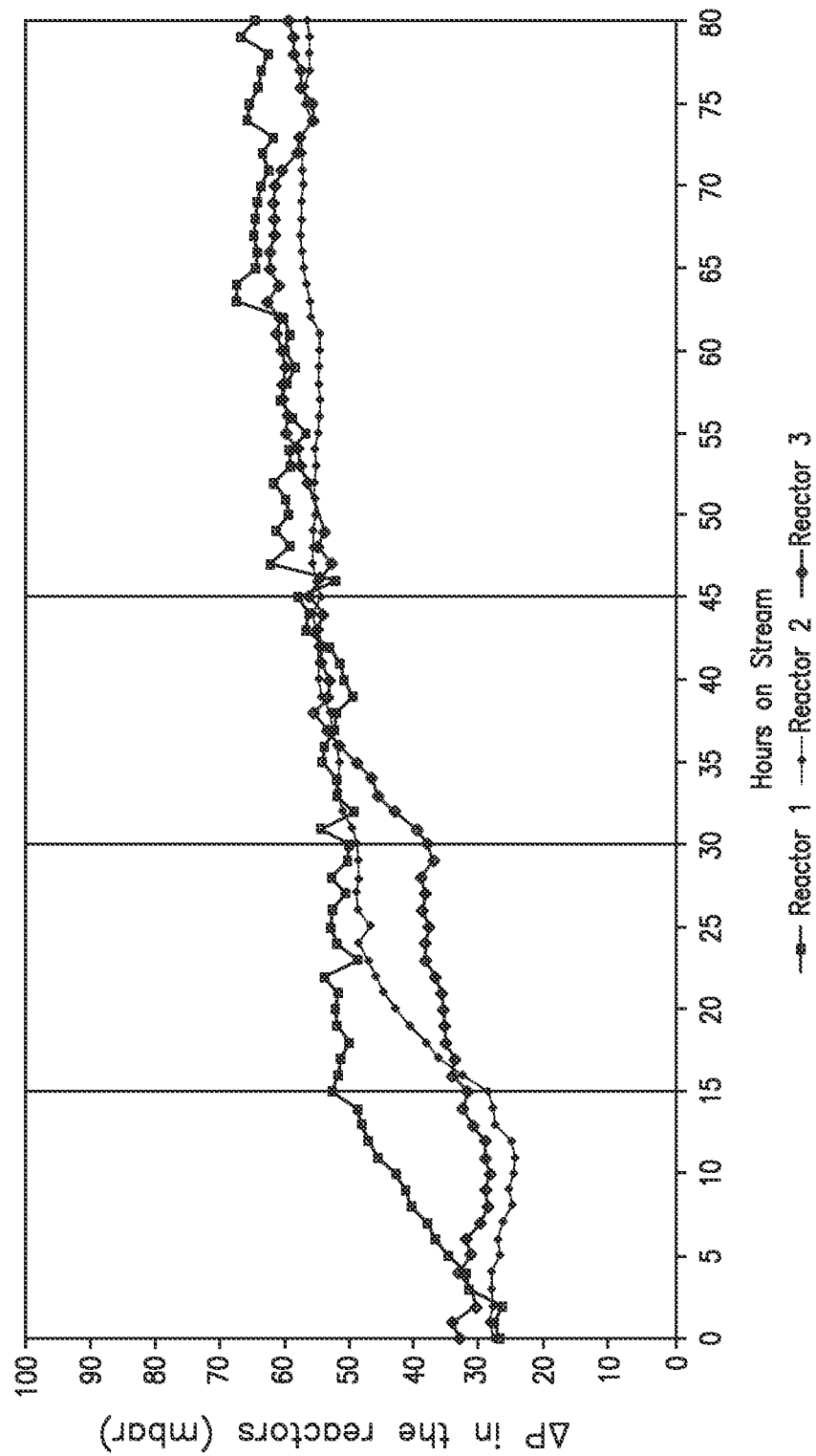
FIG. 6 schematically illustrates the pressure differential profiles of the reactor relates to phase distribution when is used the additive of the invention.

During the test, pressure differentials were measured in the three reactors, giving the profile shown in FIG. 6.

As this profile shows, the time to fill each reactor was about 15 hours, this is given by the time at where the pressure differential of the reactor has a measure more likely to be stable. In this profile it can be seen that the first reactor reaches the stable measure at around 15 hours and after the first reactor is filled up, the second reactor takes around another 15 hours to reach the stable measure, and the same behavior is shown by the third reactor.

After the fill up of the reactors the total time for stabilization is around 75 hours.

The foam reduction can be seen as the rise on the pressure differentials as a consequence of an increase in the liquid quantity due to solid concentration inside of the reactors.

With the pressure differentials it is possible to calculate the phase distribution for the first reactor. This differential was calculated at two conditions: 0 hours and during the test, as an average after the stabilization time (75 hours), the results are summarized in Table 1010.

TABLE 10

| Conditions | Without additive | With additive |
| --- | --- | --- |
| Hours on stream | 0 | After 75 h |
| Temperature (° C.) | 380 | 449 |
| ΔP in the first reactor (mbar) | 26.5 | 59.85 |
| Liquid density (kg/m³) | 804.6 | 760 |
| Liquid holdup | 0.34 | 0.69 |
| Gas holdup | 0.66 | 0.28 |
| Solid holdup | 0 | 0.03 |

As shown in Table 10, the liquid holdup in the reactor using the additive increases by a factor of 2, which is related to a higher conversion because this improves the reaction volume.

The above examples demonstrate the excellent results obtained using the additive in the hydroconversion process according to the invention.

The present disclosure is provided in terms of details of a preferred embodiment. It should also be appreciated that this specific embodiment is provided for illustrative purposes, and that the embodiment described should not be construed in any way to limit the scope of the present invention, which is instead defined by the claims set forth below.

The invention claimed is:

1. A hydroconversion process, comprising feeding (a) a heavy feedstock containing at least one feedstock metal selected from the group consisting of vanadium and nickel, (b) an unsupported catalyst emulsion containing at least one group 8-10 metal and at least one group 6 metal, (c) hydrogen and (d) an organic additive to an upflow bubble column reactor defining a hydroconversion zone under hydroconversion conditions to produce an upgraded hydrocarbon product and a solid carbonaceous material containing said group 8-10 metal, said group 6 metal, and said at least one feedstock metal, wherein the organic additive comprises a solid organic material having a particle size of between about 0.1 and about 2,000 μm, a bulk density of between about 500 and about 2,000 kg/m$^3$, a skeletal density of between about 1,000 and about 2,000 kg/m$^3$ and a humidity of between 0 and about 5 wt %, and treating the solid carbonaceous material to recover said group 8-10, said group 6 and said at least one feedstock metals.

2. The process of claim 1, wherein the organic additive is present in an amount between about 0.5 and about 5 wt % with respect to the feedstock.

3. The process of claim 1, wherein the process has a gas velocity of greater than or equal to about 4cm/s.

4. The process of claim 1, wherein the hydroconversion exhibits an asphaltene conversion rate of at least about 75 wt % and a Conradson carbon conversion of at least about 70 wt %.

5. The process of claim 1, wherein the heavy feedstock is selected from the group consisting of vacuum residue, heavy crude, extra heavy crude and combinations thereof.

6. The process of claim 1, wherein the heavy feedstock is vacuum residue.

7. The process of claim 1, wherein the heavy feedstock has an API gravity of between about 1 and about 7.

8. The process of claim 1, wherein the heavy feedstock has a metal content of between about 200 and about 2,000 wtppm.

9. The process of claim 1, wherein the metal content of the heavy feedstock comprises vanadium and nickel.

10. The process of claim 1, wherein the catalyst emulsion comprises a first catalyst emulsion containing the group 8-10 metal and a second catalyst emulsion containing the group 6 metal.

11. The process of claim 1, wherein the group 8-10 metal is selected from the group consisting of nickel, cobalt, iron and combinations thereof.

12. The process of claim 1, wherein the group 6 metal is selected from the group consisting of molybdenum, tungsten and combinations thereof.

13. The process of claim 1, wherein the group 6 metal is in the form of a group 6 sulfide metal salt.

14. The process of claim 1, wherein the organic additive comprises coke particles.

15. The process of claim 1, wherein the process is carried out on a continuous basis.

16. The process of claim 15, wherein the process is carried out with the feedstock on a once-through basis.

17. The process of claim 1, wherein the hydroconversion conditions comprise a reactor pressure of between about 130 and about 210 barg, and a reactor temperature of between about 430 and about 470° C.

18. The process of claim 1, wherein the catalyst emulsion and the heavy feedstock are fed to the reactor in amounts to provide a ratio of catalyst metals to heavy feedstock, by weight, of between about 50 and about 1,000 wtppm.

19. The process of claim 1, wherein product yield on a weight basis, excluding the solid carbonaceous material, is greater than weight of the heavy feedstock.

20. The process of claim 1, wherein the upflow bubble column reactor comprises an upflow co-current three-phase bubble column reactor.

21. The process of claim 1, wherein the organic additive controls temperature in the hydroconversion zone by improving fluid-dynamics and reducing foam in the hydroconversion zone.

22. The process of claim 1, wherein the organic additive scavenges metals from the feedstock and the catalyst emulsion.

23. The process of claim 1, wherein the catalyst emulsion comprises a water-oil emulsion containing said at least one group 8-10 metal and said at least one group 6 metal in solution in an aqueous phase of the emulsion.

24. The process of claim 23, wherein the water-oil emulsion contains an oil phase which is different from the heavy feedstock.

25. The process of claim 1, wherein the particle size is between about 20 and about 1000 pm.

* * * * *